US012691593B2

(12) United States Patent
Huang et al.

(10) Patent No.: US 12,691,593 B2
(45) Date of Patent: Jul. 28, 2026

(54) LINKAGE MECHANISM, ROBOTIC FINGER AND ROBOT

(71) Applicant: UBTECH ROBOTICS CORP LTD, Shenzhen (CN)

(72) Inventors: Zhongkui Huang, Shenzhen (CN); Ming Chen, Shenzhen (CN); Qixiang Luo, Shenzhen (CN); Hongyu Ding, Shenzhen (CN); Zheng Xie, Shenzhen (CN); Wenhua Fan, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 557 days.

(21) Appl. No.: 18/243,665

(22) Filed: Sep. 8, 2023

(65) Prior Publication Data

US 2023/0415354 A1 Dec. 28, 2023

Related U.S. Application Data

(63) Continuation of application No. PCT/CN2021/124615, filed on Oct. 19, 2021.

(30) Foreign Application Priority Data

Mar. 10, 2021 (CN) .......................... 202110261861.5

(51) Int. Cl.
B25J 15/00 (2006.01)
B25J 15/02 (2006.01)
B25J 15/12 (2006.01)

(52) U.S. Cl.
CPC ......... B25J 15/0009 (2013.01); B25J 15/022 (2013.01); B25J 15/12 (2013.01)

(58) Field of Classification Search
CPC ...... B25J 15/0009; B25J 15/022; B25J 15/12; B25J 15/08; B25J 18/00
See application file for complete search history.

(56) References Cited

U.S. PATENT DOCUMENTS 11,639,005 B2 * 5/2023 Zhao .................... B25J 15/0206
74/479.01
12,202,131 B2 * 1/2025 Huang ................. B25J 17/0258
(Continued)

FOREIGN PATENT DOCUMENTS

CN 108673540 A 10/2018
CN 110151493 A 8/2019
(Continued)

OTHER PUBLICATIONS

ISR for PCT/CN2021/124615.
Written opinions of ISA for PCT/CN2021/124615.

*Primary Examiner* — Sang K Kim

(57) ABSTRACT

A linkage mechanism includes: a base member; a first link rotatably connected to the base member, the first link defining a first arc-shaped guide groove centered on a pivot axis about which the first link rotates relative to the base member; a second link rotatably connected to the first link; a connecting member rotatably connected to the base member and the second link; an actuating mechanism including a linear actuator and a transmission member that is driven by the linear actuator, the transmission member having a first end rotatably connected to the output shaft, and a second end slidably received in the first arc-shaped guide groove. When the linear actuator drives the connecting member to extend and move, the second end of the transmission member abuts against one end of the first arc-shaped guide groove, which drives the first link to rotate relative to the base member.

20 Claims, 9 Drawing Sheets

(56) References Cited

U.S. PATENT DOCUMENTS

| | | | | |
|---|---|---|---|---|
| 2016/0008146 A1* | 1/2016 | Nagatsuka | ............. | A61F 2/583 |
| | | | | 623/64 |
| 2016/0311117 A1* | 10/2016 | Nagatsuka | ........... | B25J 15/0616 |
| 2021/0370523 A1* | 12/2021 | Zhao | ................... | B25J 15/0009 |
| 2023/0381973 A1* | 11/2023 | Martin | ................ | B25J 15/0009 |
| 2023/0415355 A1* | 12/2023 | Huang | ................ | B25J 15/0009 |

FOREIGN PATENT DOCUMENTS

| | | | |
|---|---|---|---|
| CN | 111376286 A | 7/2020 | |
| CN | 111546366 A | 8/2020 | |
| CN | 111618901 A | 9/2020 | |

* cited by examiner

LINKAGE MECHANISM, ROBOTIC FINGER AND ROBOT

CROSS REFERENCE TO RELATED APPLICATIONS

The present application is a continuation-application of International Application PCT/CN2021/124615, with an international filing date of Oct. 19, 2021, which claims foreign priority to Chinese Patent Application No. 202110261861.5, filed on Mar. 10, 2021 in the China National Intellectual Property Administration, the contents of all of which are hereby incorporated by reference in its entirety.

TECHNICAL FIELD

The present disclosure generally relates to robotic fingers, and particularly to a linkage mechanism, robotic finger, and robot.

BACKGROUND

One commonly used transmission mechanism for robotic fingers is a linkage mechanism, which is generally a four-bar mechanism with a single degree of freedom. That is, an actuator drives the linkage mechanism to move in a fixed path to realize the flexion and extension of a robotic finger. As a moving mechanism, some conventional four-bar mechanisms may tend to be damaged by the external force from collision and impact. When the four-bar mechanisms are subjected to external force, it cannot passively flex and move, and the movement appears stiff and not smooth.

Therefore, there is a need to provide a linkage mechanism to overcome the above-mentioned problem.

BRIEF DESCRIPTION OF DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
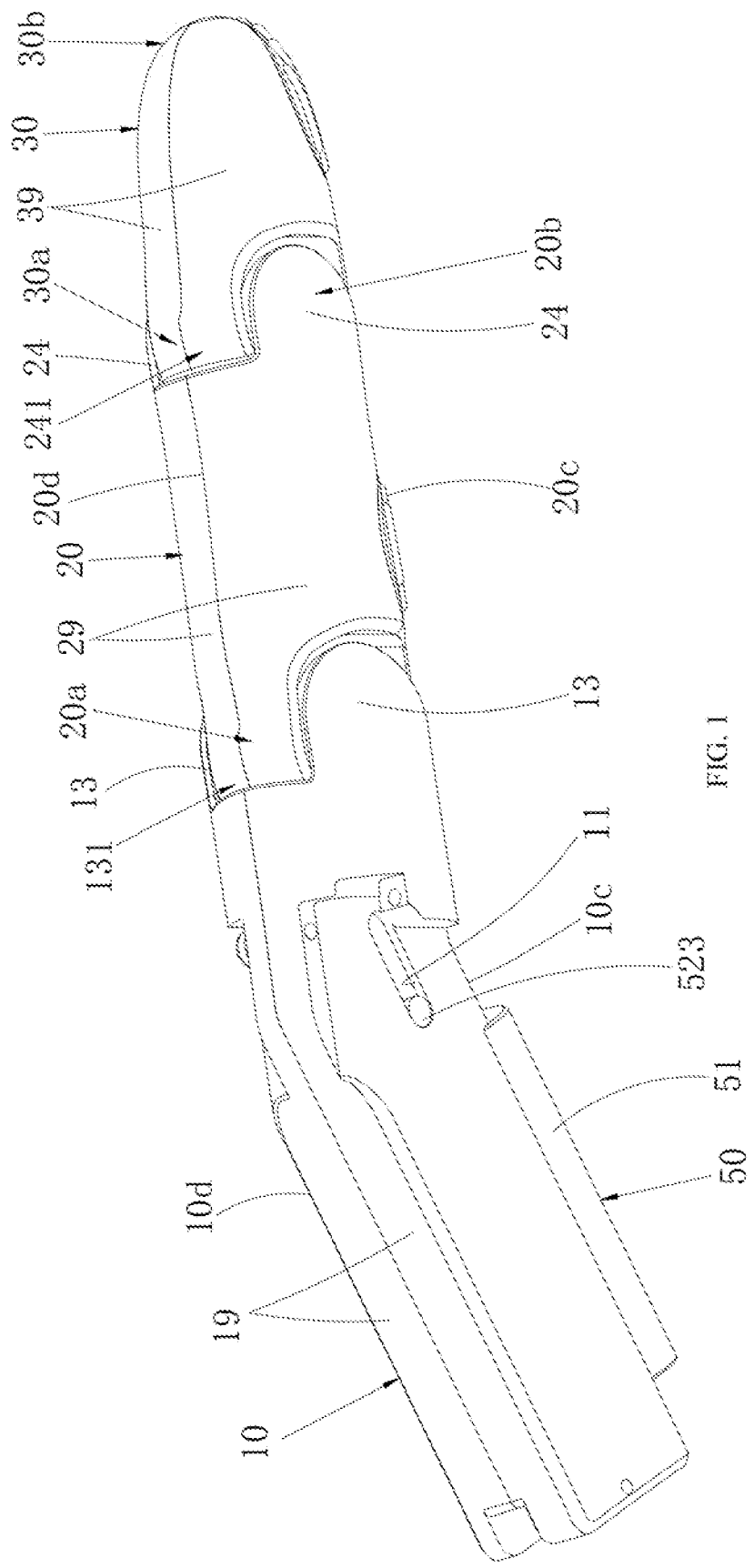
FIG. 1 is an isometric view of a linkage mechanism in an extension state according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

Figure 6:
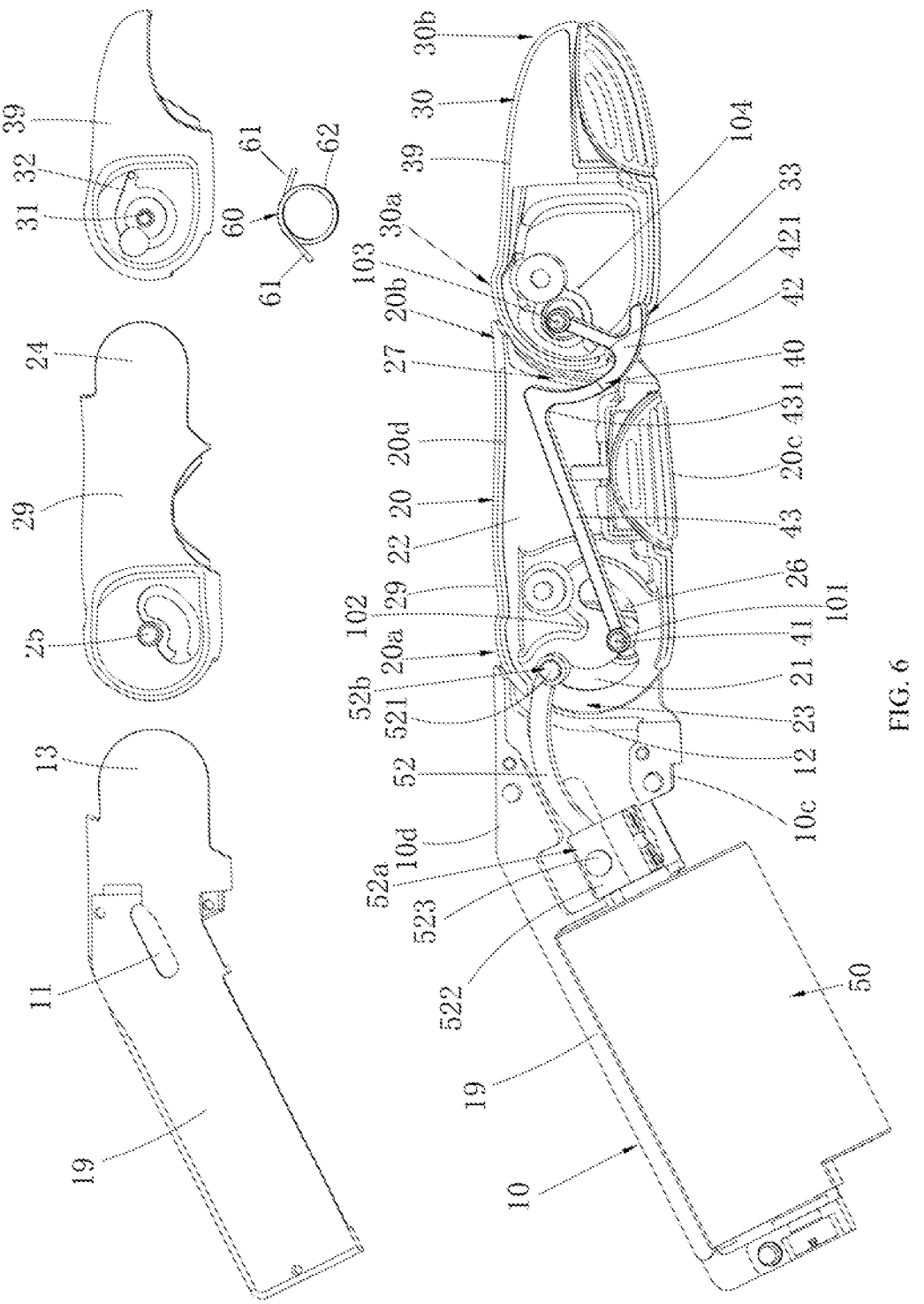
FIG. 6 is another planar exploded view of the linkage mechanism.
Figure 7:
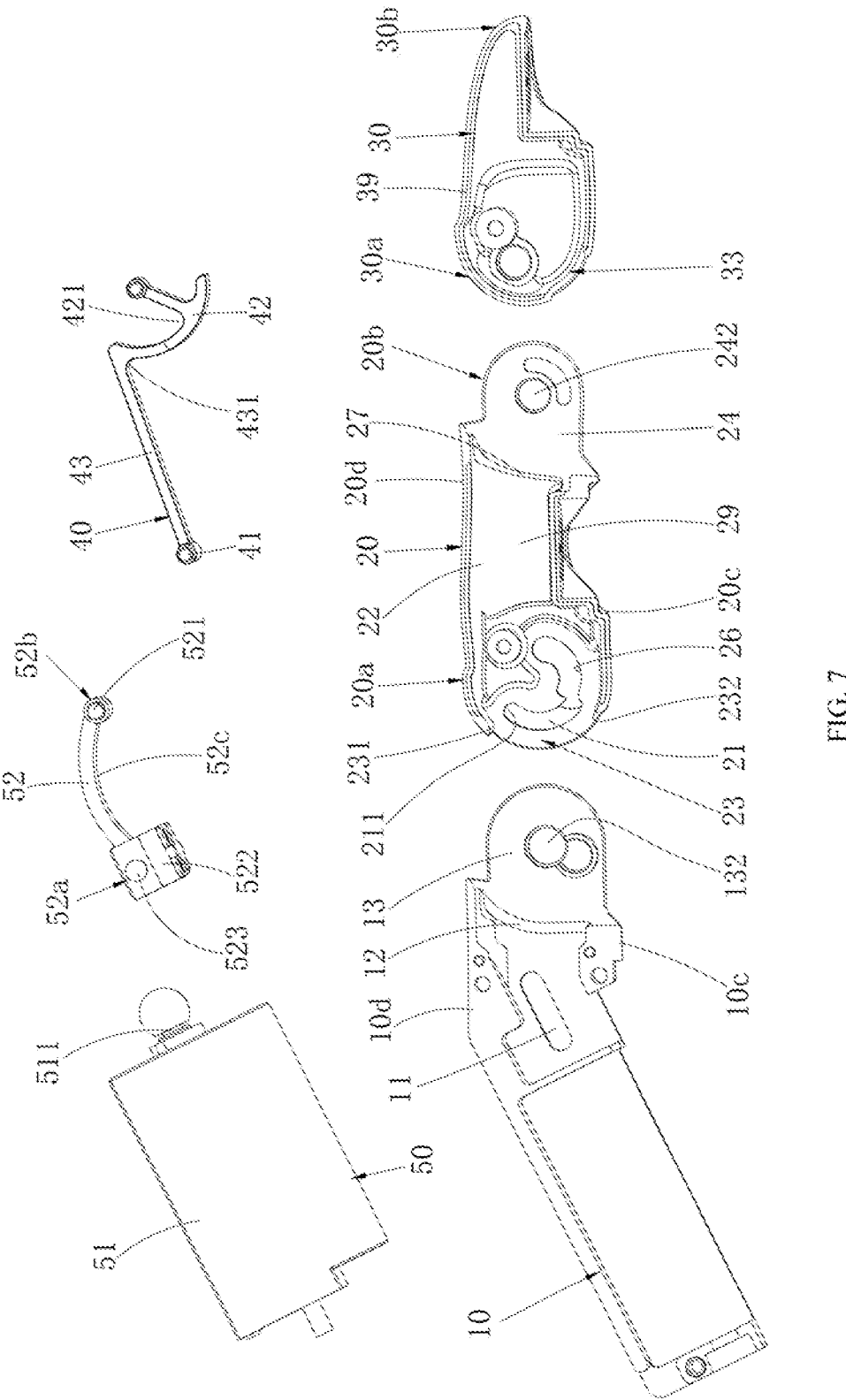
FIG. 7 is yet another planar exploded view of the linkage mechanism.
Figure 9:
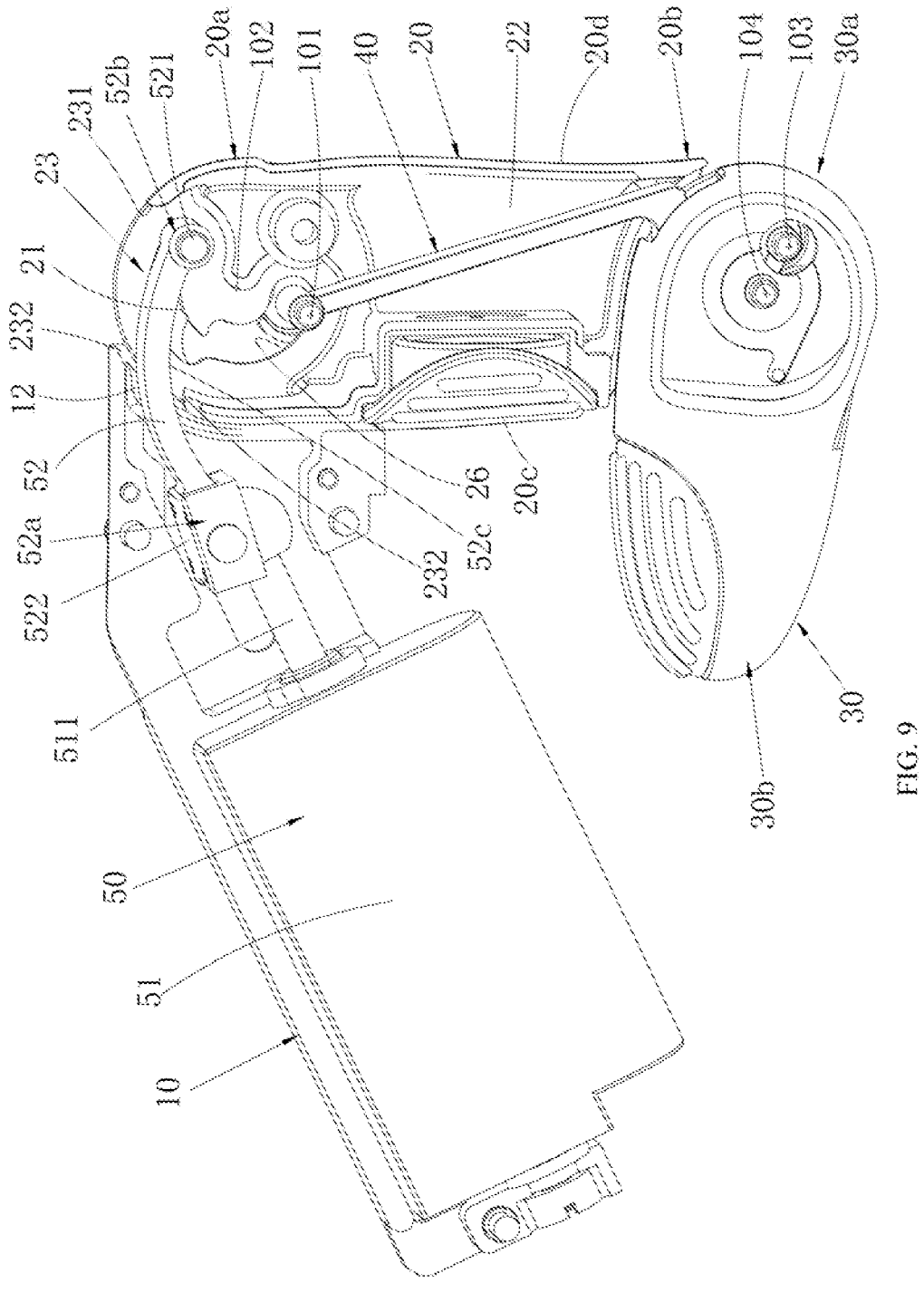
FIG. 9 is an isometric view of the linkage mechanism in an active flexion state.

Referring to FIGS. 1-4, in one embodiment, a linkage mechanism a base member 10, a first link 20, a second link 30, a connecting member 40, an actuating mechanism 50, and an elastic member 60. The first end 20a of the first link 20 is pivotally connected to the base member 10. Referring to FIGS. 5 and 7, the first link 20 defines a first arc-shaped guide groove 21 centered on a pivot axis 102 about which the first link 20 rotates relative to the base member 10, and one end of the first arc-shaped guide groove 21 is referred to as an abutment surface 211. The second link 30 is pivotally connected to the second end 20b of the first link 20. Two opposite ends of the connecting member 40 are pivotally connected to the base member 10 and the second link 30, respectively. The pivot axis 101 about which the connecting member 40 rotates relative to the base member 10 and the pivot axis 102 about which the first link 20 rotates relative to the base member 10 are spaced apart from each other. The pivot axis 103 about which the connecting member 40 rotates relative to the second linage 30 and the pivot axis 104 about which the first link 20 rotates relative to the second link 30 are spaced apart from each other. Referring to FIGS. 6 and 7, the actuating mechanism 50 includes a linear actuator 51 and a transmission member 52 driven by the linear actuator 51. The first end 52a of the transmission member 52 is hinged to the output shaft 511 of the linear actuator 51, and the second end 52b of the transmission member 52 is slidably received in the first arc-shaped guide groove 21. Referring to FIGS. 5 and 6, the two opposite ends of the elastic member 60 are respectively connected to the first link 20 and the second link 30, and the elastic member 60 is used automatically drive the second link 30 to its original position. Referring to FIGS. 7 and 9, when the linear actuator 51 drives the transmission member 52 to extend and move, the second end 52b of the transmission member 52 abuts against the abutment surface 211, so that the first link 20 swings relative to the base member 10.

Compared with some conventional link mechanisms, the base member 10, the first link 20, the second link 30 and the connecting member 40 constitute a four-bar mechanism. Active flexion, extension and passive flexion motions of the four-bar mechanism can be realized by the four-bar mechanism together with the actuating mechanism 50 and the elastic member 60. Referring to FIG. 9, the flexion state of the four-bar mechanism means that a predetermined angle is formed between the first link 20 and the base member 10, a predetermined angle is formed between the second link 30 and the first link 20, and the base member 10, the first link 20 and the second link 30 form a shape similar to a hook. Referring to FIGS. 1 and 6, the extension state of the four-bar mechanism is a state in which the base member 10, the first link 20, and the second link 30 extend substantially along a straight line.

Referring to FIGS. 7 and 9, when the linear actuator 51 drives the transmission member 52 to extend and move, the second end 52b of the transmission member 52 abuts against the abutment surface 211 of the first arc-shaped guide groove 21 of the first link 20, which can drive the first link 20 to swing relative to the base member 10. The second link 30 then moves together with the connecting member 40, and the second link swings following the swing direction of the first link 20. The elastic member 60 is compressed or twisted and stores energy. Active flexion motion is thus realized. Referring to FIGS. 5 and 6, when the linear actuator 51 drives the transmission member 52 to retract, the second end 52*b* of the transmission member 52 is abutted against the abutment surface 211 of the first arc-shaped guide groove 21. The elastic member 60 rebounds/unwinds to drive the second link 30 to return to its original position. The first link 20 rotates together with the connecting member 40 to realize the extension motion.

Figure 8:
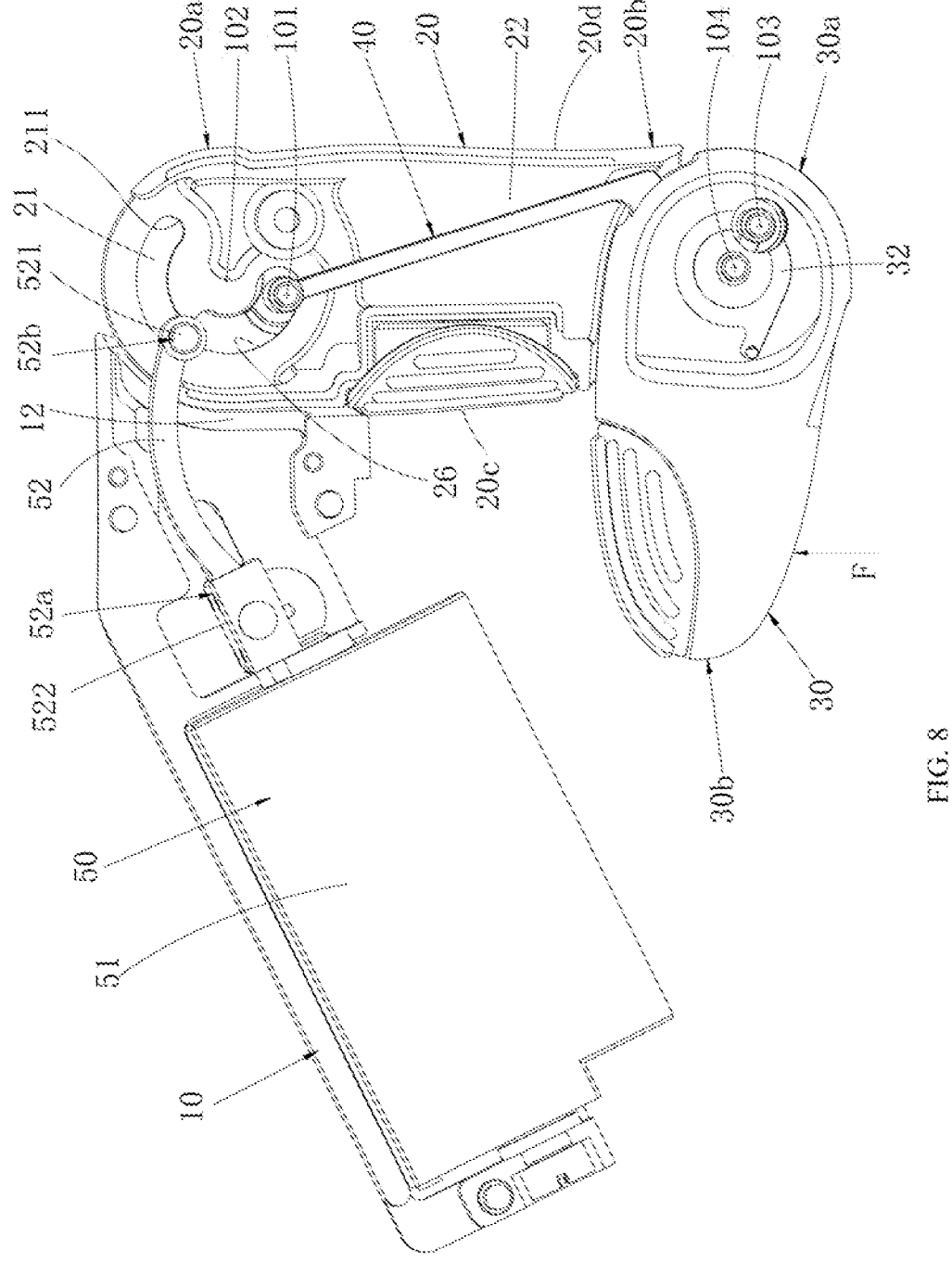
FIG. 8 is an isometric view of the linkage mechanism in a passive flexion state.

Referring to FIG. 8, regardless of whether the linear actuator 51 is in operation or not, when the second link 30 is subjected to an external force F, the second link 30 can swing and the elastic member is compressed or twisted and stores energy. The first link 20 rotates together with the connecting member 40, and the first link 20 swings following the swing direction of the second link 30. Passive flexion motion is thus realized. Since the second end 52*b* of the transmission member 52 is slidably received in the first arc-shaped guide groove 21, during the passive flexion motion, the second end 52*b* of the transmission member 52 disengages from the abutment surface 211 of the first arc-shaped guide groove 21. As a result, there will be no interference between the first link 20 and the transmission member 52, which avoids the damage of the four-bar mechanism due to external force and plays a role of impact protection. Referring to FIG. 5, after the external force is removed, the elastic member 60 rebounds/unwinds to drive the second link 30 to rotate to its original position, and the first link 20 rotates together with the connecting member 40 to realize the extension motion.

The linkage mechanism has a certain degree of passiveness, that is, it can move passively under the action of an external force, avoiding rigid collisions, and has a certain degree of flexibility. The linkage mechanism has good imitation properties when applied to robot fingers, and the linkage mechanism can be applied to other scenarios that require two-way active movement and one-way passive movement. The linkage mechanism includes multi-stage links, and the small gap between adjacent links will be enlarged, causing the linkage mechanism to easily produce a large empty position and shake. The empty position can be effectively reduced by the elastic member 60, so that the linkage mechanism does not tend to shake, and the repeated positioning accuracy of the linkage mechanism is improved.

Exemplarily, referring to FIG. 5, the linear actuator 51 may be an electric cylinder, which can output a predetermined displacement to push the transmission member 52 to move forward and backward. The second end 52*b* of the transmission member 52 abuts against the abutment surface 211 to drive the first link 20 to swing relative to the base member 10, which, combined with the elastic member 60, can realize the flexion and extension motions of the four-bar mechanism. The linear actuator 51 can be mounted on the base member 10.

Exemplarily, referring to FIG. 5, the base member 10, the first link 20, the second link 30, and the connecting member 40 form a double rocker mechanism, with the first link 20 and the connecting member 40 being rockers. The connecting member 40 and the first link 20 are respectively pivotally connected to the first end 30*a* of the second link 30 at positions spaced apart from each other, and the second end

30*b* of the second link 30 is a free end. The four-bar mechanism has an extension state and a flexion state, and is movable between the extension and flexion states.

In the process of flexing and extending of the four-bar mechanism, the first link 20 and the connecting member 40 are used as rockers, and the line passing through the two pivot points of the first link 20 (i.e., the line passing through the points formed by axes 102 and 104 in FIG. 5) and the line passing through the two pivot points of the connecting member 40 (i.e., the line passing through the points formed by axes 101 and 103 in FIG. 5) intersect with each other, which can realize the overall flexion and extension of the four-bar mechanism. That is, the actuating mechanism 50 can drive the first link 20 to swing, and the second link 30 can swing following the swing direction of the first link 20.

Referring to FIG. 5, when the four-bar mechanism is in an extension state, the structural components such as the base member 10, the first link 20 and the second link 30 are flush with one another. Being flush can mean that the structural components are connected in the same straight line, or there is a small angle between the extending directions of the structural components, such as 5°, which is not specifically limited. Referring to FIG. 9, when the four-bar mechanism is fully flexed, the base member 10 is perpendicular to the first link 20, and the first link 20 is perpendicular to the second link 30.

When the linkage mechanism is applied to a robot finger, the base member 10 can function as a proximal phalanx, the first link 20 can function as a middle phalanx, and the second link 30 can function as a distal phalanx. The robot finger can realize active flexion, extension and passive flexion motions, and has good abilities to imitate a finger of a human.

Figure 3:
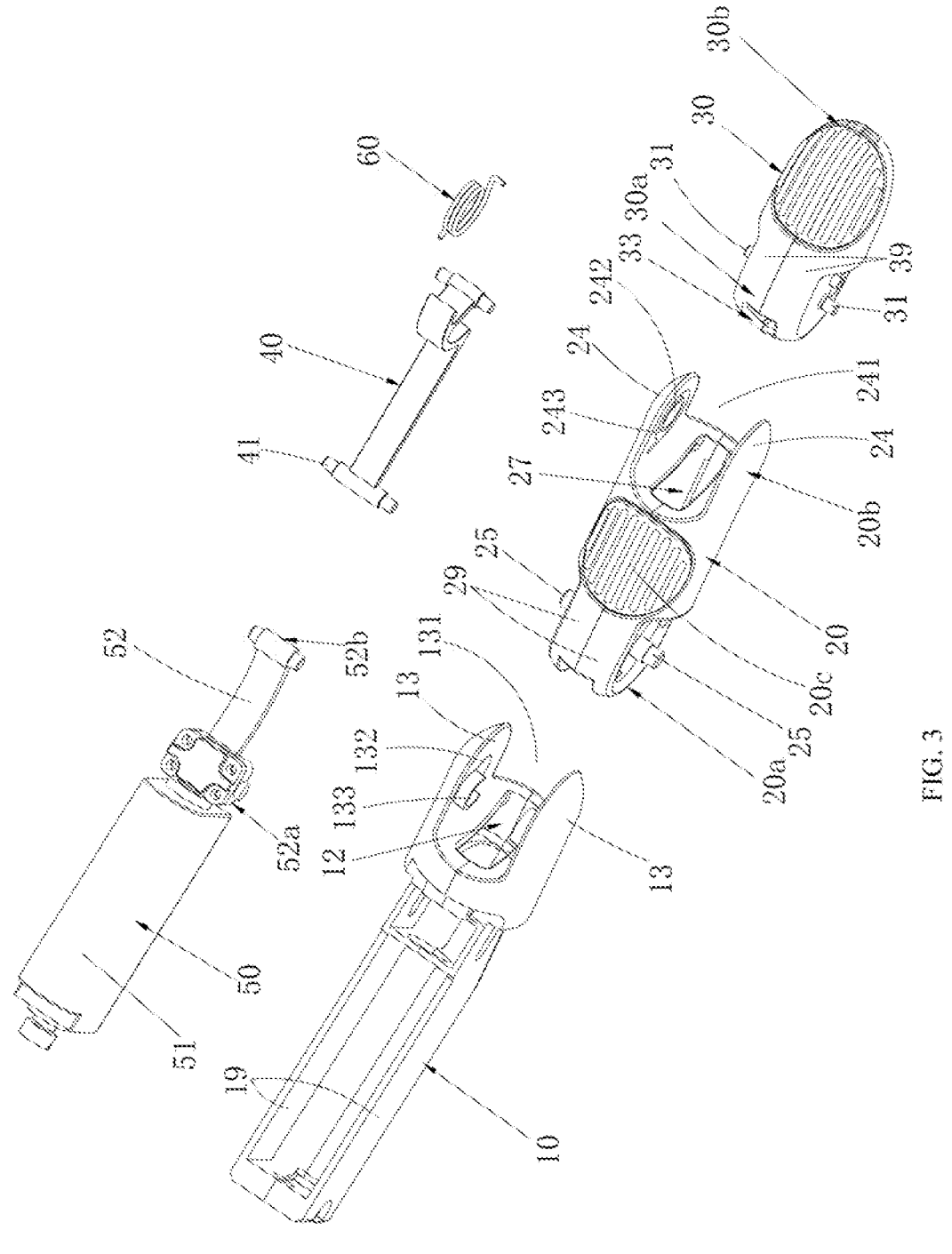
FIG. 3 is an isometric exploded view of the linkage mechanism.
Figure 4:
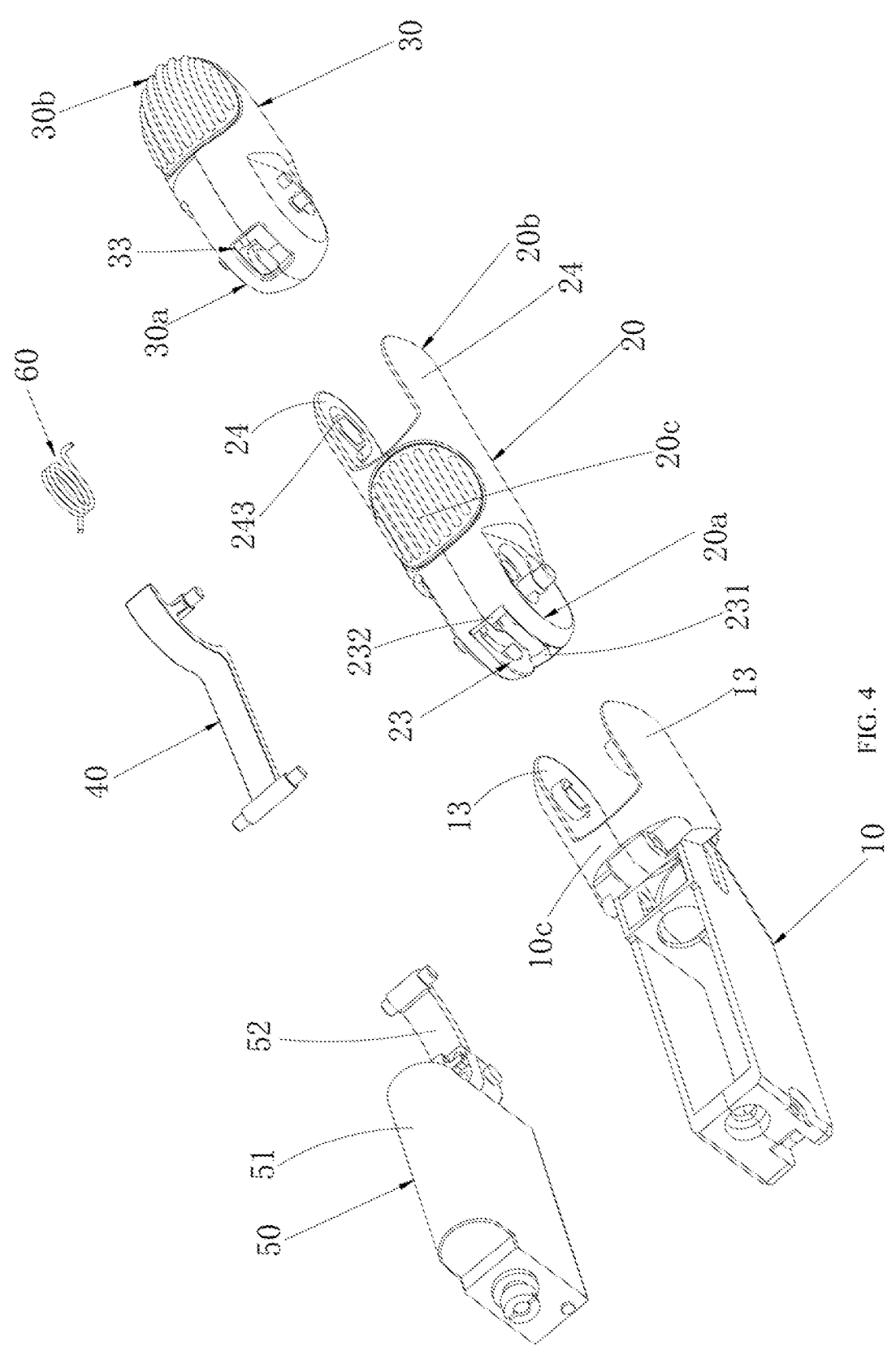
FIG. 4 is another isometric exploded view of the linkage mechanism.
Figure 5:
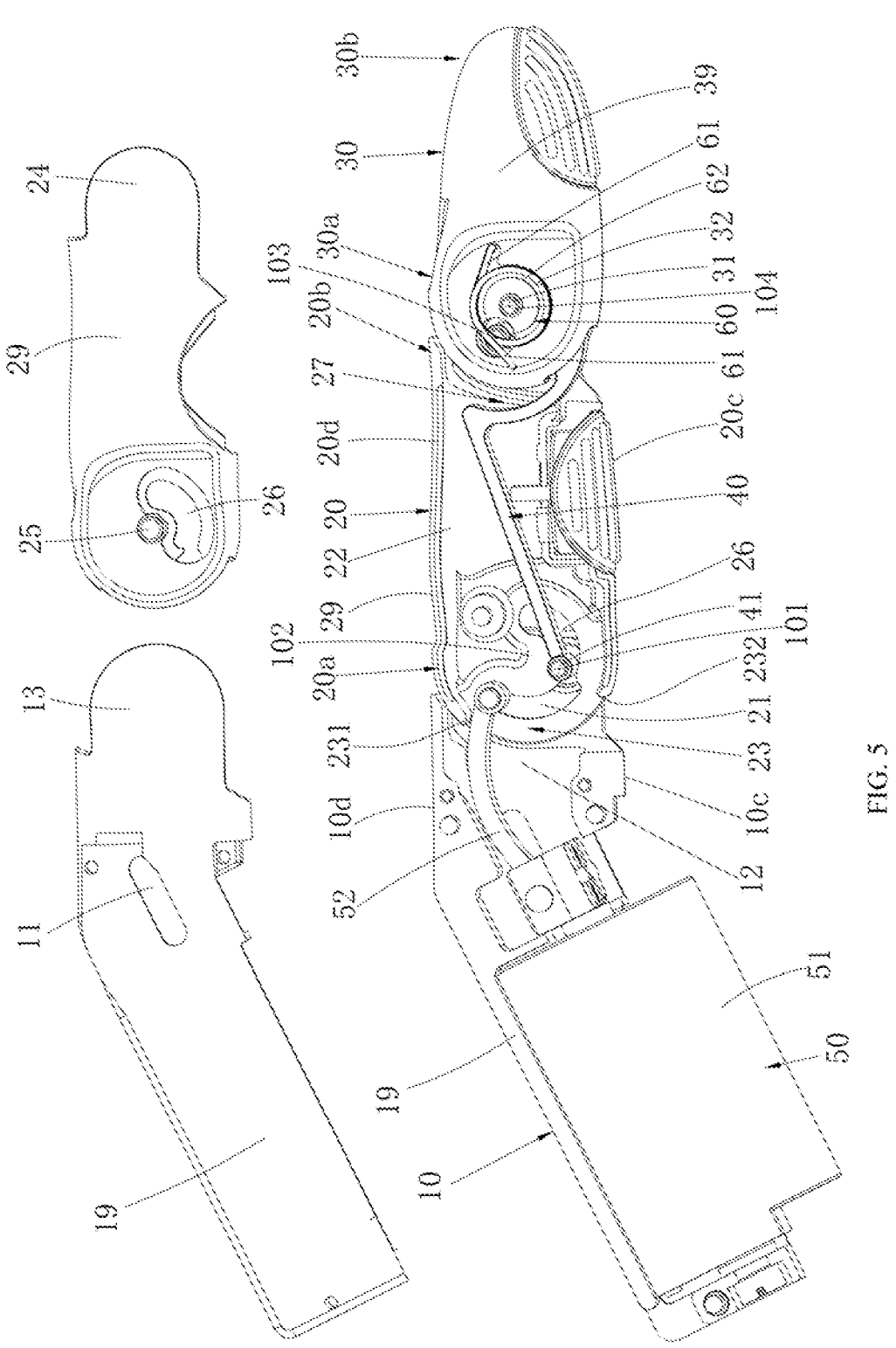
FIG. 5 is a planar exploded view of the linkage mechanism.

Exemplarily, referring to FIGS. 3 to 5, the base member 10 includes two fixing sub-shells 19 connected to each other, so as to at least partially accommodate the actuating mechanism 50 inside the base member 10. The first link 20 includes two first sub-shells 29 connected to each other, which allows a portion of the connecting member 40 to be received inside the first link 20. The second link 30 includes two second sub-housings 39 connected to each other, which allows a portion of the connecting member 40 to be received inside the first link 20. With such configuration, the base member 10, the first link 20 and the second link 30 can form a better finger appearance (as shown in FIGS. 1 and. 2).

Referring to FIG. 3, in one embodiment, a first opening 12 is defined at one end of the base member 10 close to the first link 20, and the transmission member 52 is partly located in the base member 10. The second end 52*b* of the transmission member 52 passes through the first opening 12. This can better protect the transmission member, and prevent the transmission member 52 from being exposed to the outside of the base member 10, thereby obtaining a finger-like appearance. One end of the second link 30 close to the first link 20 defines a second opening 33, and one end of the connecting member 40 passes through the second opening 33. This can better protect the connecting member 40, and prevent the connecting member 40 from being exposed to the outside of the second link 30, thereby obtaining a finger-like appearance.

Referring to FIGS. 4 and 5, in one embodiment, the first link 20 defines a chamber 22, and the first end 20*a* of the first link 20 defines a first opening 23 communicating with the chamber 22. The second end 52*b* of the transmission member 52 passes through the first opening 23. Referring to FIGS. 3 and 6, the second end 20*b* of the first link 20 is provided with a second opening 27 communicating with the chamber 22. At least a portion of the connecting member 40 is received in the first link 20. The connecting member 40 passes through the second opening 27. A portion of the connecting member 40 is disposed inside the first link 20 to better protect the connecting member 40 and prevent the connecting member 40 from being exposed outside the first link 2, thereby obtaining a finger-like appearance.

Referring to FIGS. 4 and 5, in one embodiment, the inner surface of the first opening 23 includes a first inner surface 231, and the abutment surface 211 is disposed close to the first inner surface 231. Referring to FIG. 9, when the linear actuator 51 drives the transmission member 52 to extend and travel a maximum distance, the second end 52b of the transmission member 52 abuts against the abutment surface 211, and the transmission member 52 can cover the first opening 23. In order to meet the requirement of no interference between the first link 20 and the transmission member 52 during active motion and passive motion, the first link 20 is provided with a larger first opening 23 to avoid the transmission member 52. Referring to FIG. 5, the inner side 20c and the outer side 20d of the first link 20 are respectively the inner side 20c and the outer side 20d of the first link 20 when the four-bar mechanism is in a flexion motion. The first inner surface 231 is a portion of the inner surface of the first opening 23 that is close to the outer side 20d of the first link 20. Referring to FIG. 9, during the active flexion motion, the linear actuator 51 drives the transmission member 52 to extend and move, and the transmission member 52 can gradually cover the first opening 23. When the output shaft 511 of the linear actuator 51 is extended to the maximum position to move the transmission member 52 to its maximum position, the second end 52b of the transmission member 52 is abutted against the abutment surface 211, close to the first inner surface 231. In this case, the transmission member 52 basically covers the first opening 23, preventing a user from accidentally touching the first opening 23 and causing injury, and allowing the connection between the first link 20 and the base member 10 to obtain a better appearance.

Referring to FIGS. 7 and 9, in one embodiment, the transmission member 52 is extended along a predetermined curve, and the center of curvature of the predetermined curve faces the inner side 10c of the base member 10. Referring to FIG. 4, the inner surface of the first opening 23 includes a second inner surface 232 spaced apart from the first inner surface 231. When the linear actuator 51 drives the transmission member 52 to extend and travel a maximum distance, the second inner surface 232 is disposed close to the inner concave side 52c of the transmission member 52. The inner side 10c and the outer side 10d of the base member 10 are respectively the inner side 10c and the outer side 10d of the base member 10 when the four-bar mechanism is in a flexion motion. The second inner surface 232 is a portion of the inner surface of the first opening 23 that is close to the inner side 20c of the first link 20. The transmission member 52 is arranged to extend along a curve with the inner concave side 52c facing the inner side 10c of the base member 10. This can adapt to the situation that the first end 20a of the first link 20 is a smooth curved surface, so that the transmission member 52 can obtain a better appearance when covering the first opening 23, and the second inner surface 232 is close to the center of the first opening 23, which can reduce the size of the first opening 23. Exemplarily, the transmission member 52 is extended along an arc, so as to adapt to the situation that the first end 20a of the first link 20 is arc-shaped.

Referring to FIGS. 3 to 5, in one embodiment, the second end 52b of the transmission member 52 has a connecting shaft 521, and the two opposite inner surfaces of the first link 20 each have one first arc-shaped guide groove 21 that are coaxial with each other. Two opposite ends of the connecting shaft 521 are slidably received in the two first arc-shaped guide grooves 21. In this way, the second end 52b of the transmission member 52 can be slidably and stably connected to the first link 20, and the reliability of the mechanism can be improved.

Referring to FIGS. 6 and 7, in one embodiment, the first end 52a of the transmission member 52 has a mounting base 522 connected to the output shaft 511 of the linear actuator 51, and one side of the mounting base 522 is protruded with a guide post 523. A linear guide groove 11 extending along a direction parallel to the output shaft 511 of the linear actuator 51 is defined in a side surface of the base member 10, and the guide post 523 is slidably received in the linear guide groove 11. By the engagement of the guide post 523 with the linear guide groove 11, it can realize the forward and backward movement of the transmission member 52 in a predetermined direction, thereby improving the reliability of the mechanism. The output shaft 511 of the linear actuator 51 can be connected to the first end 52a of the transmission member 52 by a ball joint, which facilitates the assembly of the transmission member 52 to the output shaft 511 of the linear actuator 51 and reduces the difficulty of assembly. In addition, it facilitates power transmission, so that the output shaft 511 of the linear actuator 51 can drive the transmission member 52 to move back and forth.

Figure 2:
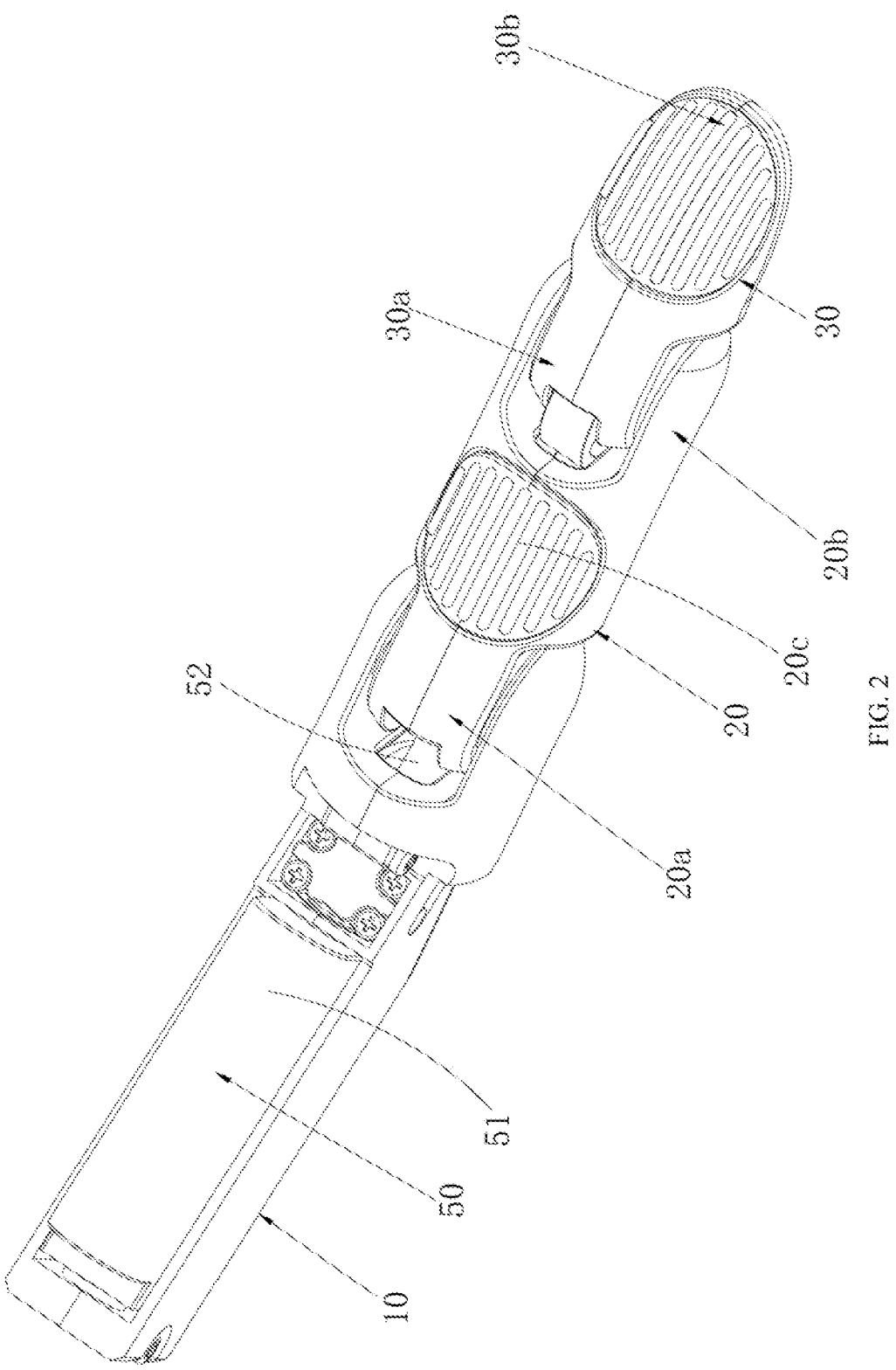
FIG. 2 is another isometric view of the linkage mechanism in an extension state according to one embodiment.

Referring to FIGS. 2 and 3, in one embodiment, the first link 20 has two first connecting walls 24 spaced apart from each other, and a first space 241 is formed between the two first connecting walls 24. One end of the second link 30 is received the first space 241, and is pivotally connected to the first connecting walls 24. In this way, one end of the second link 30 can be reliably pivotally connected to the first link 20.

Referring to FIGS. 2 and 3, in one embodiment, the inner surface of each first connecting wall 24 is provided with a first pivot hole 242, and each of the two opposite sides of the second link 30 is provided with a first pivot shaft 31. The first pivot shafts 31 are supported in the first pivot holes 242 through bearings (not shown). The bearings can reduce the frictional force between the first pivot shafts 31 and the inner surface of the first pivot holes 242, so that the first pivot shafts 31 and the first pivot holes 242 are reliably connected to each other. As a result, one end of the second link 30 is reliably pivotally connected to the first link 20.

Referring to FIGS. 3, 5, and 6, in one embodiment, the elastic member 60 is a torsion spring, and the inner surface of one of the first connecting walls 24 is provided with a first positioning groove 243. The outer surface of the second link 30 is provided with a second positioning groove 32. One portion of the torsion spring is disposed in the first positioning groove 243, and the other portion is disposed in the second positioning groove 32. The two arms 61 of the torsion spring are respectively disposed against the one of the first connecting walls 24 and the second link 30. In this way, it can fix the torsion spring between the first link 20 and the second link 30, making full use of the axial space and making the structure compact. The first positioning groove 243 can position a portion of the helical part 62 and one arm 61 of the torsion spring, and the second positioning groove 32 can position a portion of the helical part 62 and the other arm 61 of the torsion spring. The two arms 61 can pass through the one of the first connecting walls 24 and the second link 30, respectively, so as to realize the fixing of the arms 61.

Referring to FIGS. 1 and 3, in one embodiment, the base member 10 has two second connecting walls 13 spaced apart from each other, and a second space 131 is formed between the two second connecting walls 13. The first end 20a of the first link 20 is received in the second space 131, and pivotally connected to the second connecting walls 13. In this way, the first end 20a of the first link 20 can be reliably pivotally connected to the base member 10.

Referring to FIG. 3, in one embodiment, the inner surface of each second connecting wall 13 is provided with a second pivot hole 132, and each of the two opposite sides of the first link 20 is provided with a second pivot shaft 25. The second pivot shafts 25 are supported in the second pivot holes 132 through bearings (not shown). The bearings can reduce the friction force between the second pivot shafts 25 and the inner surfaces of the second pivot holes 132, so that the second pivot shafts 25 and the second pivot holes 132 are reliably connected to each other, and the first end 20a of the first link 20 is reliably pivotally connected to the base member 10.

Referring to FIGS. 6 and 7, in one embodiment, the first link 20 is provided with a second arc-shaped guide groove 26, and the second arc-shaped guide groove 26 is centered on the pivot axis 102 about which the first link 20 rotate relative to the base member 10. One end of the connecting member 40 has a pivot shaft 41 that passes through the second arc-shaped guide groove 26. One end of the pivot shaft 41 is pivotally connected to one second connecting wall 13. For example, as shown in FIG. 3, one end of the pivot shaft 41 is inserted into the pivot hole 133 of one second connecting wall 13. The axis of the pivot shaft 41 is the pivot axis 101 about which the connecting member 40 rotates relative to the base member 10. The pivot shaft 41 passes through the first link 20 and is connected to the base member 10, and then the connecting member 40 is pivotally connected to the base member 10. The end of the pivot shaft 41 can be supported on the second connecting wall 13 through a bearing (not shown), which can reduce the friction between the pivot shaft 41 and the second connecting wall 13. Thus, the connecting rod 40 is reliably pivotally connected to the second connecting wall 13.

Referring to FIGS. 6 and 7, in one embodiment, the connecting member 40 includes a first bent portion 42, and the concave side 421 of the first bent portion 42 faces the outer side 20d of the first link 20. One end of the first bent portion 42 is pivotally connected to the second link 30. The connecting member 40 further includes a second bent portion 43 connected to one end of the first bent portion 42, and the concave side 431 of the second bent portion 43 faces the inner side 20c of the first link 20. One end of the second bent portion 43 is pivotally connected to the base member 10. The bent portions can be understood as bent structures with concave sides formed by bending rods. The bent portions are roughly 7-shaped or T-shaped, and the specific shaping method is not limited. The connecting member 40 is formed to include the first bent portion 42 and the second bent portion 43. The concave side 421 of the first bent portion 42 and the concave side 431 of the second bent portion 43 face different directions. The first bent portion 42 and the second bent portion 43 are approximately in a single-cycle sinusoidal structure, which can improve the elasticity of the connecting member 40 to absorb the external impact, and allow the second link 30 to immediately return to the original state when the external impact disappears.

In one embodiment, a robotic finger includes the linkage mechanism discussed above. Specifically, the base member 10 is to function as a proximal phalanx, the first link 20 is to function as a middle phalanx, and the second link 30 is to function as a distal phalanx. The base member 10, the first link 20 and the second link 30 are arranged in sequence. Since the robotic finger includes all the features discussed above, it has all the beneficial effects brought by the features discussed above, which will not be repeated here.

In one embodiment, a robot includes the linkage mechanism discussed above. Since the robot includes all the features discussed above, it has all the beneficial effects brought by the features discussed above, which will not be repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A linkage mechanism comprising:
a base member;
a first link having a first end and an opposite, second end, the first end rotatably connected to the base member, the first link defining a first arc-shaped guide groove centered on a pivot axis about which the first link rotates relative to the base member;
a second link rotatably connected to the second end of the first link;
a connecting member having two opposite ends rotatably connected to the base member and the second link;
an actuating mechanism comprising a linear actuator comprising an output shaft and a transmission member that is driven by the linear actuator, the transmission member comprising a first end rotatably connected to the output shaft, and an opposite, second end slidably received in the first arc-shaped guide groove; and
an elastic member connected to the first link and the second link, the elastic member configured to drive the second link to an original position of the second link;
wherein when the linear actuator drives the connecting member to extend and move, the second end of the transmission member abuts against one end of the first arc-shaped guide groove, which drives the first link to rotate relative to the base member.

2. The linkage mechanism of claim 1, wherein the first link defines a chamber, the first end of the first link defines a first opening in communication with the chamber, the first opening comprises a first inner surface, the second end of the transmission member passes through the first opening, the end of the first arc-shaped guide groove is located adjacent to the first inner surface, when the linear actuator drives the transmission member to travel a maximum distance, the second end of the transmission member is abutted against the end of the first arc-shaped guide groove, and the transmission member covers the first opening.

3. The linkage mechanism of claim 2, wherein the transmission member extends along a predetermined curve, and a center of curvature of the predetermined curve faces an inner side of the base member, the first opening comprises a second inner surface spaced apart from the first inner surface, when the linear actuator drives the transmission member to travel the maximum distance, the first inner surface is adjacent to an inner concave side of the transmission member.

4. The linkage mechanism of claim 1, wherein the second end of the transmission member comprises a connecting shaft, the first arc-shaped guide groove comprises a first guide groove and a second guide groove that are defined in two opposite inner surfaces of the first link, two opposite ends of the connecting shaft are slidably received in the first guide groove and the second guide groove, respectively.

5. The linkage mechanism of claim 1, wherein the first end of the transmission member comprises a mounting base connected with the output shaft of the linear actuator, and a guide post protrudes from the mounting base, the base defines a linear guide groove extending along a direction parallel to the output shaft of the linear actuator, and the guide post is slidably received in the linear guide groove.

6. The linkage mechanism of claim 1, wherein the first link comprises two first connecting walls spaced apart from each other, a first space is formed between the two first connecting walls, one end of the second link is received in the first space, and rotatably connected to the first connecting walls.

7. The linkage mechanism of claim 1, wherein the elastic member is a torsion spring, one of the first connecting walls defines a first positioning groove, an outer surface of the second link defines a second positioning groove, the elastic member is partly received in the first positioning groove and the second positioning groove, and is abutted against the one of the first connecting walls and the second link.

8. The linkage mechanism of claim 1, wherein the base member comprises two second connecting walls spaced apart from each other, a second space is formed between the two second connecting walls, and the first end of the first link is received in the second space, and rotatably connected to the second connecting walls.

9. The linkage mechanism of claim 8, wherein the first link defines a second arc-shaped guide groove that is centered on the pivot axis about which the first link rotates relative to the base member, one end of the connecting member comprises a pivot shaft that passes through the second arc-shaped guide groove, and one end of the pivot shaft is rotatably connected to one of the second connecting walls.

10. The linkage mechanism of claim 1, wherein the connecting member comprises a first bent portion, and a concave side of the first bent portion faces an external surface of the first link, one end of the first bent portion is pivotally connected to the second link, the connecting member further comprises a second bent portion connected to one end of the first bent portion, a concave side of the second bent portion faces an inner surface of the first link, and one end of the second bent portion is pivotally connected to the base member.

11. The linkage mechanism of claim 1, wherein the first link defines a chamber, at least a portion of the connecting member is accommodated in the first link, the second end of the first link defines a second opening communicating with the chamber, and the connecting member passes through the second opening.

12. A robotic finger comprising:
a base member;
a first link having a first end and an opposite, second end, the first end rotatably connected to the base member, the first link defining a first arc-shaped guide groove centered on a pivot axis about which the first link rotates relative to the base member;

a second link rotatably connected to the second end of the first link;
a connecting member having two opposite ends rotatably connected to the base member and the second link;
an actuating mechanism comprising a linear actuator comprising an output shaft and a transmission member that is driven by the linear actuator, the transmission member comprising a first end rotatably connected to the output shaft, and an opposite, second end slidably received in the first arc-shaped guide groove; and
an elastic member connected to the first link and the second link, the elastic member configured to drive the second link to an original position of the second link;
wherein when the linear actuator drives the connecting member to extend and move, the second end of the transmission member abuts against one end of the first arc-shaped guide groove, which drives the first link to rotate relative to the base member;
wherein the base member is configured to function as a proximal phalanx, the first link is configured to function as a middle phalanx, and the second link is configured to function as the distal phalanx.

13. The robotic finger of claim 12, wherein the first link defines a chamber, the first end of the first link defines a first opening in communication with the chamber, the first opening comprises a first inner surface, the second end of the transmission member passes through the first opening, the end of the first arc-shaped guide groove is located adjacent to the first inner surface, when the linear actuator drives the transmission member to travel a maximum distance, the second end of the transmission member is abutted against the end of the first arc-shaped guide groove, and the transmission member covers the first opening.

14. The robotic finger of claim 13, wherein the transmission member extends along a predetermined curve, and a center of curvature of the predetermined curve faces an inner side of the base member, the first opening comprises a second inner surface spaced apart from the first inner surface, when the linear actuator drives the transmission member to travel the maximum distance, the first inner surface is adjacent to an inner concave side of the transmission member.

15. The robotic finger of claim 12, wherein the second end of the transmission member comprises a connecting shaft, the first arc-shaped guide groove comprises a first guide groove and a second guide groove that are defined in two opposite inner surfaces of the first link, two opposite ends of the connecting shaft are slidably received in the first guide groove and the second guide groove, respectively.

16. The robotic finger of claim 12, wherein the first end of the transmission member comprises a mounting base connected with the output shaft of the linear actuator, and a guide post protrudes from the mounting base, the base defines a linear guide groove extending along a direction parallel to the output shaft of the linear actuator, and the guide post is slidably received in the linear guide groove.

17. The robotic finger of claim 12, wherein the first link comprises two first connecting walls spaced apart from each other, a first space is formed between the two first connecting walls, one end of the second link is received in the first space, and rotatably connected to the first connecting walls.

18. The robotic finger of claim 12, wherein the elastic member is a torsion spring, one of the first connecting walls defines a first positioning groove, an outer surface of the second link defines a second positioning groove, the elastic member is partly received in the first positioning groove and the second positioning groove, and is abutted against the one of the first connecting walls and the second link.

19. The robotic finger of claim 12, wherein the base member comprises two second connecting walls spaced apart from each other, a second space is formed between the two second connecting walls, and the first end of the first link is received in the second space, and rotatably connected to the second connecting walls.

20. A robot comprising:

a robotic finger comprising:

a base member;

a first link having a first end and an opposite, second end, the first end rotatably connected to the base member, the first link defining a first arc-shaped guide groove centered on a pivot axis about which the first link rotates relative to the base member;

a second link rotatably connected to the second end of the first link;

a connecting member having two opposite ends rotatably connected to the base member and the second link;

an actuating mechanism comprising a linear actuator comprising an output shaft and a transmission member that is driven by the linear actuator, the transmission member comprising a first end rotatably connected to the output shaft, and an opposite, second end slidably received in the first arc-shaped guide groove; and an elastic member connected to the first link and the second link, the elastic member configured to drive the second link to an original position of the second link;

wherein when the linear actuator drives the connecting member to extend and move, the second end of the transmission member abuts against one end of the first arc-shaped guide groove, which drives the first link to rotate relative to the base member;

wherein the base member is configured to function as a proximal phalanx, the first link is configured to function as a middle phalanx, and the second link is configured to function as the distal phalanx.

* * * * *